Sept. 10, 1963

J. M. WALTER 3,103,144

COLLET CLAMP FOR MACHINE TOOLS

Filed May 3, 1960

INVENTOR.
JOHN M. WALTER,

BY

ATTORNEYS.

United States Patent Office 3,103,144
Patented Sept. 10, 1963

3,103,144
COLLET CLAMP FOR MACHINE TOOLS
John M. Walter, Cincinnati, Ohio, assignor to The G. A. Gray Company, Cincinnati, Ohio, a corporation of Ohio
Filed May 3, 1960, Ser. No. 26,648
3 Claims. (Cl. 90—11)

This invention relates to a collet clamp for machine tools such as horizontal boring mills, horizontal drilling machines and horizontal milling machines or combinations thereof. Such machines generally have a spindle housing which may be adjusted vertically on a column and in the spindle housing a drive sleeve is rotatably mounted and a spindle is slidably keyed to the drive sleeve, so that it is rotated when the drive sleeve is rotated. Means are provided to rotate the drive sleeve by suitable gearing providing for a variety of speeds of rotation and means are also provided for feeding the spindle axially with respect to the drive sleeve for such operations as boring and drilling.

In order to avoid chatter which is objectionable because it adversely affects the finish produced by the machining operation, a clamp has generally been provided in the form of a collet of tapered configuration and held in place and adjusted by a ring screwed on the drive sleeve. By tightening the ring, using a heavy spanner wrench, the collet could be wedged between the drive sleeve and the spindle to clamp them securely together. The clamping effect was removed by unscrewing the ring so that the spindle could be fed axially.

It is an object of the present invention to provide a collet clamp which is operated by fluid pressure and it can therefore be applied and released much more easily than by tightening up or loosening the ring with the heavy spanner wrench. Since this operation is easy, operators will use the clamp, whereas under present conditions they are inclined not to undertake the back-breaking job of tightening the ring. This results in a sacrifice in machine accuracy and efficiency. Besides, if the spindle is started up and the operator has forgotten to remove the large heavy wrench, there is danger of injury to personnel and to the machine.

It is another object of the invention to provide a fluid pressure operated collet clamp and to provide for clamping of the spindle for rotation without feeding at a high pressure and for snugging of the spindle with respect to the drive sleeve at a relatively low pressure where it is desired to feed the spindle axially during rotation.

These and various other objects of the invention which will be explained in more detail hereinafter or which will be apparent to one skilled in the art upon reading these specifications are accomplished by that certain construction and arrangement of parts and by that method of which the following describes an exemplary embodiment.

Reference is made to the drawings forming a part hereof and in which.

Figure 1:
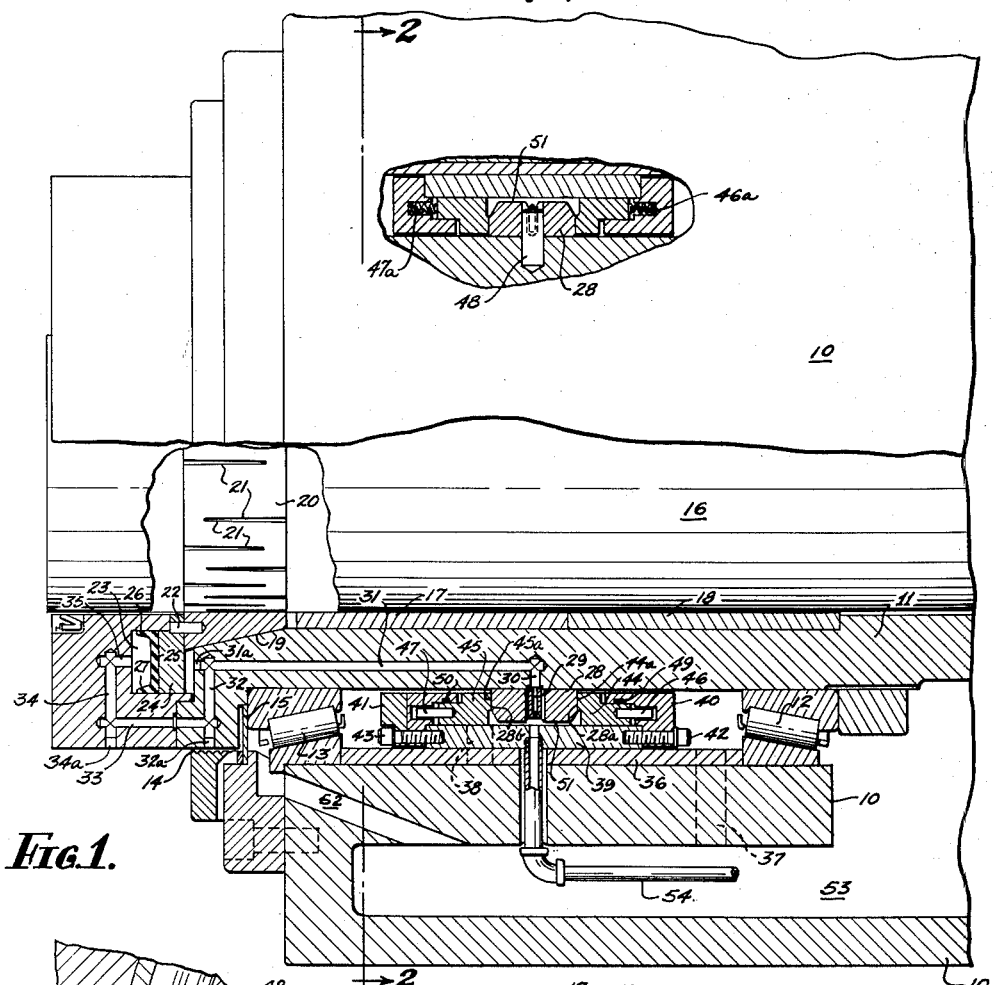
FIGURE 1 is a fragmentary cross-sectional view taken on the line 1—1 of FIGURE 2 through a spindle housing of a typical tool in the class described above. The upper portion of the figure is broken away and the sectional view visible through the broken portion is taken on the line 1a—1a of FIGURE 1.
Figure 2:
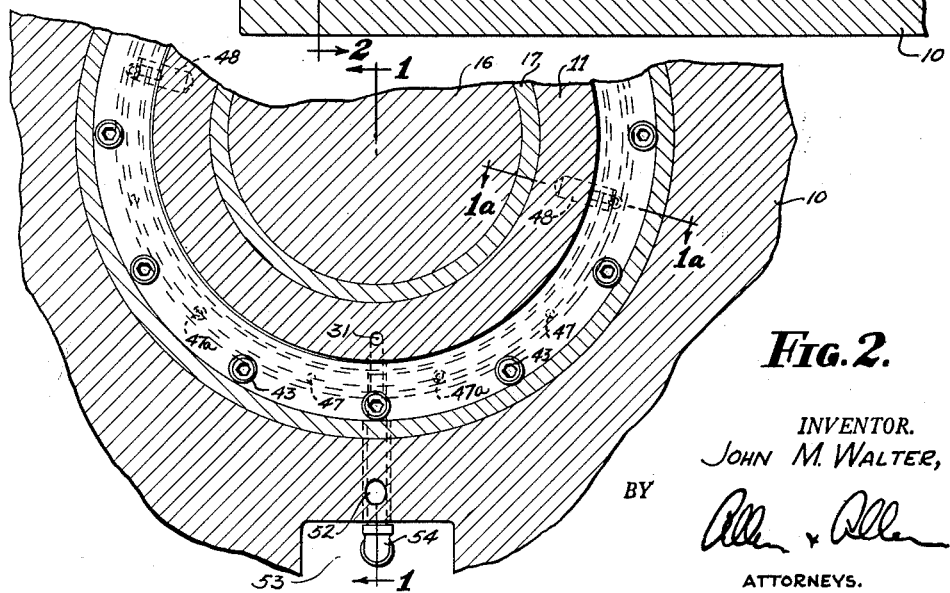
FIGURE 2 is a fragmentary cross-sectional view taken on the line 2—2 of FIGURE 1.

Briefly, in the practice of the invention, the drive sleeve is provided with an annular groove opening toward the collet and constituting an annular cylinder. Within this annular cylinder there is provided an annular piston. The drive sleeve is provided with a fluid passage communicating at one end with the annular cylinder behind said piston and at its other end with an annular projection on the drive sleeve. Through this annular projection the passage opens into an annular chamber and means are provided to supply fluid under pressure to this chamber and to seal the chamber.

Referring now in greater detail to the drawings, the spindle housing of the machine is indicated generally at 10. Within this housing a drive sleeve 11 is rotatably mounted by means of the two sets of roller bearings 12 and 13. The inner races of the bearings 12 and 13 are secured to the drive sleeve 11 and the outer races are fast with the housing 10. The bearing structure is conventional and will not be described in detail and a conventional labyrinth seal is provided at 14, together with a washer of Teflon or like material indicated at 15 to prevent the coolant material used with the cutting tool from getting into the bearing structure and also to prevent the hydraulic fluid from escaping.

Slidably keyed within the drive sleeve 11 is the spindle 16. As pointed out above and as is conventional, the spindle being keyed to the drive sleeve must rotate with the drive sleeve, but by virtue of the slidable key the spindle 16 can be moved axially with respect to the sleeve 11. Hardened steel bushings may be provided as at 17 and 18 as is also conventional.

The drive sleeve 11 is provided with the tapered surface 19 in which is seated the clamping collet 20. This collet is annular and of tapered cross-section, as clearly shown in FIGURE 1. It is slotted from alternate sides, as at 21, to permit a small amount of expansion and contraction.

The collet 20 is pinned to the drive sleeve 11 as at 22 and the drive sleeve is provided with the annular groove 23 which constitutes an annular cylinder. Within the annular cylinder 23 there is provided the annular piston 24 and an annular rubber washer 25 which is preferably provided with peripheral flanges 26 and 27.

It will be clear that by virtue of the pin 22, the collet 20 is rotationally fixed with respect to the driving sleeve and it will also be clear that if pressure is applied to the cylinder 23 to the left of the washer 25 in FIGURE 1, the collet 20 is moved toward the right in the figure, thus in effect being wedged between the surface 19 of the driving sleeve 11 and the spindle 16.

The driving sleeve 11 is provided with an annular projection 28 having a bore 29. A series of drilled holes 30, 31, 32, 33, 34 and 35, suitably plugged as at 32a, 34a and 31a, provide a passage for fluid under pressure.

A ring 36 between the outer bearing races of the bearings 12 and 13 is fixed to the spindle housing 10 as by one or more dowels 37 and has fixed to it, as by means of one or more dowels 38, a ring 39. Retaining members 40 and 41 are bolted to the ring 39 by the bolts 42, 43 and between each of the retainers 40 and 41 and the projection 28 mentioned above are the sealing members 44 and 45. The surfaces 44a, 45a of the members 44 and 45 are in sealing engagement with the surfaces 28a and 28b respectively of the projection 28. The pins 46, 47 permit axial movement of the sealing rings 44 and 45 by constraining these rings against rotation. Thus, a rotary seal is provided between the surfaces 28a, 44a and 28b, 45a. The members 44 and 45 are urged into sealing engagement by springs 46a, 47a (see section 1a—1a) and the projection 28 is fixed to the driving sleeve 11 for rotation therewith by one or more pins 48.

To seal the surfaces which slide in relation to each other during axial movement of the members 44 and 45, O-rings are provided as at 49 and 50.

It will now appear from the foregoing that an annular chamber is provided at 51 so that if pressure is applied to the annular chamber 51, it will be applied through the bore 29 and the drilled holes 30 to 35 inclusive to the cylinder 23 regardless of the rotational position of the drive sleeve, while hydraulic fluid passing between the rotary sealing surfaces ultimately passes through the bearings 12 and 13 and returns through a passage 52 to the sump 53 provided in the spindle housing. Hydraulic fluid under pressure passes through the tube 54 from a pump (not shown) into the chamber 51 mentioned above and from this chamber, of course, through the passages described above to the cylinder 23.

By any conventional means, provision may be made to apply pressure of different orders to the collet 20. Such means are well understood among hydraulics engineers and are not shown in detail. From the method standpoint, however, it is desirable to applying a relatively high pressure to the collet 20 for clamping the spindle firmly within the drive sleeve for rotation without axial feed. For this purpose a pressure on the order of 400 pounds per square inch is suitable when it is desired not only to drive the spindle in rotation but also to feed it axially, the pressure applied to the collet may be reduced to a pressure on the order of 75 pounds per square inch, which will snug the spindle within the drive sleeve sufficiently to minimize or avoid chatter while at the same time permitting axial feed during rotation.

In any well known manner the clamp valve will be tied in with the conventional pendant switch so that when the selector switch on the pendant station is set for the spindle to be fed or traversed, the high clamping pressure is released. When the selector switch is set for the head, and/or the column to be fed or traversed, high pressure is applied and the clamp is set. This makes the clamping action automatic. For snugging up the collet for a fine finishing cut, it is a simple matter to provide a two position valve which may be thrown to supply low pressure fluid to the collet actuating piston. Such valves and circuits have not been illustrated since they do not constitute a part of the present invention.

It will be understood that numerous modifications may be made without departing from the spirit of the invention and no limitations not set forth in the claims are to be implied.

What is claimed is:

1. In a machine tool having a spindle, and a drive sleeve through which said spindle may be fed axially, and by means of which it may be rotated, said sleeve having an internally tapered portion; an annular tapered collet between said spindle and drive sleeve, said drive sleeve having an annular groove opening toward the wider end of said collet and constituting an annular cylinder, an annular piston in said annular cylinder, a flanged annular resilient washer behind said annular piston, and means for applying fluid pressure against said annular washer to actuate said piston, and thus to move said collet axially, whereby said tapered collet cooperates with said tapered portion of said sleeve, to take up play between said drive sleeve and spindle.

2. In a machine tool having a spindle, and a drive sleeve through which said spindle may be fed axially, and by means of which it may be rotated, said sleeve having an internally tapered portion; an annular tapered collet between said spindle and drive sleeve, said drive sleeve having an annular groove opening toward the wider end of said collet and constituting an annular cylinder, an annular piston in said annular cylinder, said drive sleeve having a fluid passage communicating at one end with said annular cylinder, and at its other end with an annular chamber, means for supplying fluid under pressure to said annular chamber through said housing, and seal means providing a rotary seal for said annular chamber between said housing and drive sleeve, whereby pressure applied against said annular piston moves said collet axially whereby said tapered collet co-operates with said tapered portion of said sleeve, to take up play between said drive sleeve and spindle.

3. In a machine tool having a spindle, and a drive sleeve through which said spindle may be fed axially, and by means of which it may be rotated, said sleeve having an internally tapered portion; an annular tapered collet between said spindle and drive sleeve, said drive sleeve having an annular groove opening toward the wider end of said collet and constituting an annular cylinder, an annular piston in said annular cylinder, said drive sleeve having a fluid passage communicating at one end with said annular cylinder, and at its other end, through an annular projection on said drive sleeve, with an annular chamber between said drive sleeve and housing, said drive sleeve being provided with annular abutments, one on each side of said annular projection, and an axially slidable sealing ring between each of said annular abutments and said annular projection, spring means urging said abutments into sealing engagement with said annular projection, and sealing means for each of the axially slidable surfaces, whereby pressure applied to said annular piston moves said collet axially whereby said tapered collet cooperates with said tapered portion of said sleeve, to take up play between said drive sleeve and spindle.

References Cited in the file of this patent

UNITED STATES PATENTS

| | | |
|---|---|---|
| 1,123,881 | Ingle et al. | Jan. 5, 1915 |
| 2,255,176 | Lucas et al. | Sept. 9, 1941 |
| 2,557,405 | Armitage et al. | June 19, 1951 |
| 2,860,547 | Stephan | Nov. 18, 1958 |
| 2,911,222 | Eve | Nov. 3, 1959 |
| 2,938,500 | Damijonaitis | May 3, 1960 |
| 2,957,393 | Kampmeier | Oct. 25, 1960 |